(12) United States Patent
Murano et al.

(10) Patent No.: US 7,697,811 B2
(45) Date of Patent: Apr. 13, 2010

(54) HORIZONTAL FIBER OPTIC PATCHING ASSEMBLY

(75) Inventors: Adam Murano, Lebanon, CT (US); Chester H. Rynaski, Franklin, CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 12/206,298

(22) Filed: Sep. 8, 2008

(65) Prior Publication Data

US 2010/0061691 A1    Mar. 11, 2010

(51) Int. Cl.
G02B 6/00 (2006.01)
(52) U.S. Cl. .................. 385/135; 385/134
(58) Field of Classification Search .......... 385/135
See application file for complete search history.

(56) References Cited

U.S. PATENT DOCUMENTS

| | | | | |
|---|---|---|---|---|
| 6,438,310 B1 * | 8/2002 | Lance et al. | .................. | 385/135 |
| 6,466,724 B1 * | 10/2002 | Glover et al. | ................ | 385/135 |
| 6,504,988 B1 * | 1/2003 | Trebesch et al. | ............ | 385/135 |
| 6,677,520 B1 * | 1/2004 | Kim et al. | ...................... | 174/50 |
| 6,715,619 B2 * | 4/2004 | Kim et al. | ...................... | 211/26 |
| 6,748,155 B2 * | 6/2004 | Kim et al. | .................... | 385/135 |
| 6,792,190 B2 * | 9/2004 | Xin et al. | ..................... | 385/135 |
| 6,870,734 B2 * | 3/2005 | Mertesdorf et al. | ....... | 361/679.4 |
| 6,944,389 B2 * | 9/2005 | Giraud et al. | ................ | 385/135 |
| 7,102,884 B2 * | 9/2006 | Mertesdorf et al. | ....... | 361/679.4 |
| 7,236,677 B2 * | 6/2007 | Escoto et al. | ................ | 385/135 |
| 7,302,149 B2 * | 11/2007 | Swam et al. | ................. | 385/134 |
| 7,310,474 B2 * | 12/2007 | Kanasaki et al. | ............ | 385/147 |
| 7,330,626 B2 * | 2/2008 | Kowalczyk et al. | ......... | 385/135 |
| 7,349,615 B2 * | 3/2008 | Frazier et al. | ................ | 385/135 |
| 7,397,996 B2 * | 7/2008 | Herzog et al. | ............... | 385/135 |
| 7,418,182 B2 * | 8/2008 | Krampotich | ................. | 385/135 |
| 7,437,049 B2 * | 10/2008 | Krampotich | ................. | 385/135 |
| 7,460,758 B2 * | 12/2008 | Xin | ............................. | 385/135 |
| 7,493,002 B2 * | 2/2009 | Coburn et al. | ............... | 385/135 |
| 7,509,015 B2 * | 3/2009 | Murano | ....................... | 385/135 |
| 7,509,016 B2 * | 3/2009 | Smith et al. | .................. | 385/135 |
| 2003/0202765 A1 * | 10/2003 | Franklin et al. | ............. | 385/135 |
| 2004/0086252 A1 * | 5/2004 | Smith et al. | .................. | 385/135 |
| 2006/0275008 A1 * | 12/2006 | Xin | ............................. | 385/135 |
| 2007/0031099 A1 * | 2/2007 | Herzog et al. | ............... | 385/135 |
| 2008/0175551 A1 * | 7/2008 | Smrha et al. | ................. | 385/135 |
| 2008/0175552 A1 * | 7/2008 | Smrha et al. | ................. | 385/135 |
| 2009/0067800 A1 * | 3/2009 | Vazquez et al. | ............. | 385/135 |

OTHER PUBLICATIONS

Corning Cable Systems Plug & Play Universal Systems, Mar. 2008, 2 pages.

(Continued)

*Primary Examiner*—Ryan Lepisto
(74) *Attorney, Agent, or Firm*—McCarter & English, LLP

(57) ABSTRACT

Assemblies and methods are provided for facilitating fiber optic patching. More particularly, the assemblies and methods generally involve mounting fiber optic patch ports arranged along a horizontal plane with respect to a tray. The tray is movably positioned within a cabinet enclosure, e.g., in a pivotal or translational (sliding) relationship, thereby providing easy access to the ports. The horizontal configuration advantageously increases fiber optic patching density within a cabinet structure while maintaining port accessibility.

25 Claims, 15 Drawing Sheets

OTHER PUBLICATIONS

CommScope product literature, SYSTIMAX Solutions, SYSTIMAX InstaPATCH Plus Fiber System, Jun. 2008, 5 pages.

Otronics product literature, Momentum Modular Fiber Optic Systems, 2009, 6 pages.

Ortronics product literature, OptiMo High Performance Fiber Optic Solutions, 2009, 12 pages.

TIA Standard, Telecommunications Infrasturcture Standard for Data Centers, TIA-942, Apr. 2005, 148 pages.

TIA Standard, FOCIS 10, Fiber Optic Connector Intermateability Standard—Type LC, TIA/EIA-604-10A, Mar. 2002, 38 pages.

TIA Standard, FOCIS 3, Fiber Optic Connector Intermateability Standard, TIA/EIA-604-3, Aug. 1997, 22 pages.

* cited by examiner

HORIZONTAL FIBER OPTIC PATCHING ASSEMBLY

BACKGROUND

1. Technical Field

The present disclosure relates to assemblies and methods directed to fiber optic patching arrays.

2. Background Art

Fiber optic patching systems have become more prevalent in the structured cabling market as the need for high speed applications continues to grow. In some cases, fiber optic patching systems have displaced legacy copper patching systems as the need for bandwidth has exceeded the theoretical maximums associated with copper. In central offices, data centers and other wired buildings, fiber optic patch panels have become a necessary media to route connections between switches, servers, storage devices and the general office area. By 'patching', or temporarily creating a connection between physically mated connectors, it is possible to reconfigure network connections from a central location.

As shown in the Telecommunication Industry of America (TIA) Standard for Data centers, TIA-942, a patch panel interface frequently exists as an integral part of a building's architecture. Due to the relatively large space that data centers can occupy, it is recommended that building architects plan for data center and telecommunication room accommodations early in a design process. This is a notable departure from the past, where telecommunication rooms were often an afterthought or even left out of the design process entirely.

In order to reduce the effective area that a patching system utilizes in a facility, suppliers of fiber optic cables and interface apparatus have taken steps to reduce the size of the fiber optic connector. As is known to one having ordinary skill in the art, the term "adapter" is interchangeable with the term "coupler" and refers to a device that creates a connection between two fiber optic ferrules, each containing a light carrying medium of fiber. An adapter typically contains a ceramic or phosphorous bronze alignment sleeve and one or more features that provide for latching a connector into the adapter. An MT-RJ adapter, however, does not include an alignment sleeve because the fibers are aligned by precision pins and holes on the mating connector ferrules. An example of recent technology advances associated with connector technology is the LC connector as defined by TIA-604-10. The LC connector features a 50% size reduction relative to its predecessor, the SC connector as defined by the TIA-604-3.

Separately, suppliers of fiber optic connectivity hardware have recently been providing modular cassette patching products to the premise industry. Products currently on the market include the Ortronics Momentum™ system, Systemax Insta-PATCHT™ system, and the Corning Plug & Play™ system. These cassette systems allow the user to create a passive network link with minimal experience in fiber optics. A user can install the cassette into a vertical rack cabinet, such as the Ortronics FC02U-P, connect a backbone cable terminated with an MPO connector to the rear of the cassette, connect a patch cord to the front of the cassette and then on to an optical transceiver. The same is repeated at the other end of the backbone cable, thereby creating an optical data link.

To date, rack systems utilize vertical stacking of the cassettes. FIG. 1 illustrates an exemplary embodiment of a vertical stacking cassette cabinet assembly 1 associated with prior art assemblies. Assembly 1 includes an enclosure 9 defining a receiving cavity 2. Tray 14 is adapted to host a plurality of fiber optic ports (not shown). The ports are often included on a cassette shell (not shown) that can be secured on a bottom tray surface 5. The ports (also commonly referred to as jacks) are accessed through openings 6 defined along a front face 7 extending upwardly with respect to tray 4.

Tray 4 can translate axially along a horizontal axis "x" by sliding the tray in and out of cavity 2. Rear patching access to the cassettes is generally achieved by sliding tray 4 out from cavity 2. When tray 4 is fully inserted within cavity 2, cabinet 9 can be closed via a hingedly connected front door 3. Front door 3 can include a locking feature 8 for securely locking cabinet 9 and preventing unauthorized access to the cassettes.

According to the prior art assemblies, the cassettes hosted on bottom surface 5 align the fiber optic ports vertically along axis "y". This configuration disadvantageously prevents further use in the deeper portions associated with cavity 2. Since the density of fiber optic ports is substantially limited, a relatively large number of cabinets is often necessary to appropriately accommodate a particular data center.

Conventional vertical stacking technique allows for the user to easily insert and remove patch cords from the patch panel as well as manage the fiber in vertical cable managers. Historically, only the vertical plane of the rack has been used/available for patching access. However, a need exists to further increase the density of fiber optic connectors that may fit into a given floor space in a data center or telecommunications room.

These and other disadvantages and/or limitations are addressed and/or overcome by the assemblies and methods of the present disclosure.

SUMMARY

The present disclosure relates to assemblies and methods for facilitating fiber optic patching. More particularly, the present disclosure involves assemblies and methods, wherein fiber optic patch ports are arranged along a horizontal plane (horizontally-aligned) with respect to a tray. By mounting the fiber optic adapters on a horizontal plane, the user is able to take advantage of the depth of the cabinet for patching. The fiber optic ports may be advantageously mounted with respect one or both sides of the tray. The disclosed tray is movably positioned within a cabinet enclosure. Thus, in exemplary embodiments, the tray may pivot and/or slide in/out of one or more sides of the cabinet enclosure. The present disclosure, however is not limited to embodiments employing sliding and/or pivoting mechanisms, provided that the tray is removably associated with the cabinet enclosure. In exemplary embodiments, the cabinet enclosure is adapted to receive a plurality of trays. Thus, a typical cabinet enclosure associated with the present disclosure may be customized for a desired network.

Furthermore, in exemplary embodiments, the fiber optic ports are organized and arranged in defined structures, e.g., quad structures, and/or defined configurations, e.g., pairing transmission ports with receiving ports. Such exemplary port organizations/arrangements advantageously facilitate mounting of the ports relative to the tray and promote cable/system management. In some embodiments, fiber optic cassette organizations/arrangements are employed in order to effect plug-and-go capability. Thus, in exemplary embodiments of the present disclosure, a patching assembly may include a plurality of cassettes mounted relative to the tray such that the fiber optic adapters are arrayed in a substantially horizontal relationship. The cassettes may be removably/interchangeably installed relative to the tray.

The presently disclosed patching assemblies and methods present many advantages over prior art. For example, the horizontally-aligned configuration of the ports advantageously increases fiber optic patching density within a cabinet structure while maintaining port accessibility.

Additional features, functions and benefits of the disclosed assemblies and methods will be apparent from the description which follows, particularly when read in conjunction with the appended figures.

BRIEF DESCRIPTION OF THE DRAWINGS

To assist those of ordinary skill in the art in making and using the disclosed assemblies and methods, reference is made to the appended figures, wherein.

DESCRIPTION OF EXEMPLARY EMBODIMENT(S)

According to the present disclosure, advantageous assemblies and methods are provided for facilitating fiber optic patching. More particularly, the disclosed assemblies and methods generally involve mounting fiber optic patch ports arranged along a horizontal plane (horizontally-aligned) with respect to a tray. The tray is movably positioned within a cabinet enclosure, e.g. via a pivotal or translational (sliding) relationship, thereby providing easy access to the ports. Thus, the horizontally-aligned configuration advantageously increases fiber optic patching density within a cabinet structure while maintaining port accessibility. In exemplary embodiments, the ports are organized/arranged in defined structures, e.g., quad structures and/or defined configurations, e.g., pairing transmission ports with receiving ports. The ports may also be organized in cassette casings (with or without plug-and-go capabilities). Such port organizations/arrangements advantageously facilitate mounting of the ports relative to the tray and promote cable/system management. In exemplary embodiments, cable management structures, e.g. fiber management clips and/or cable management spools, may also be incorporated in order to further promote cable management.

Figure 1:
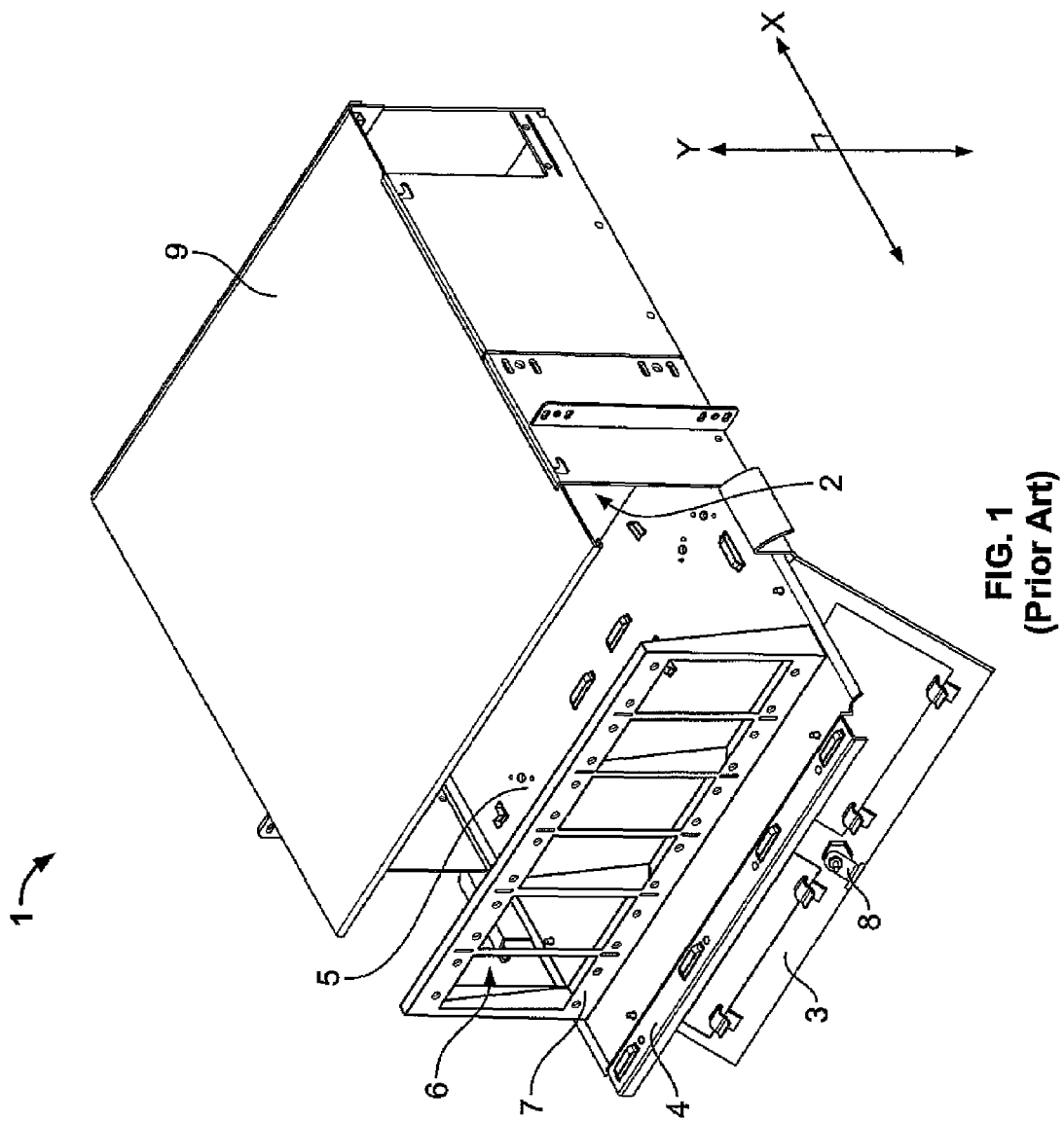
FIG. 1 is a perspective view of a prior art vertically-aligned fiber optic patching assembly.
Figure 2:
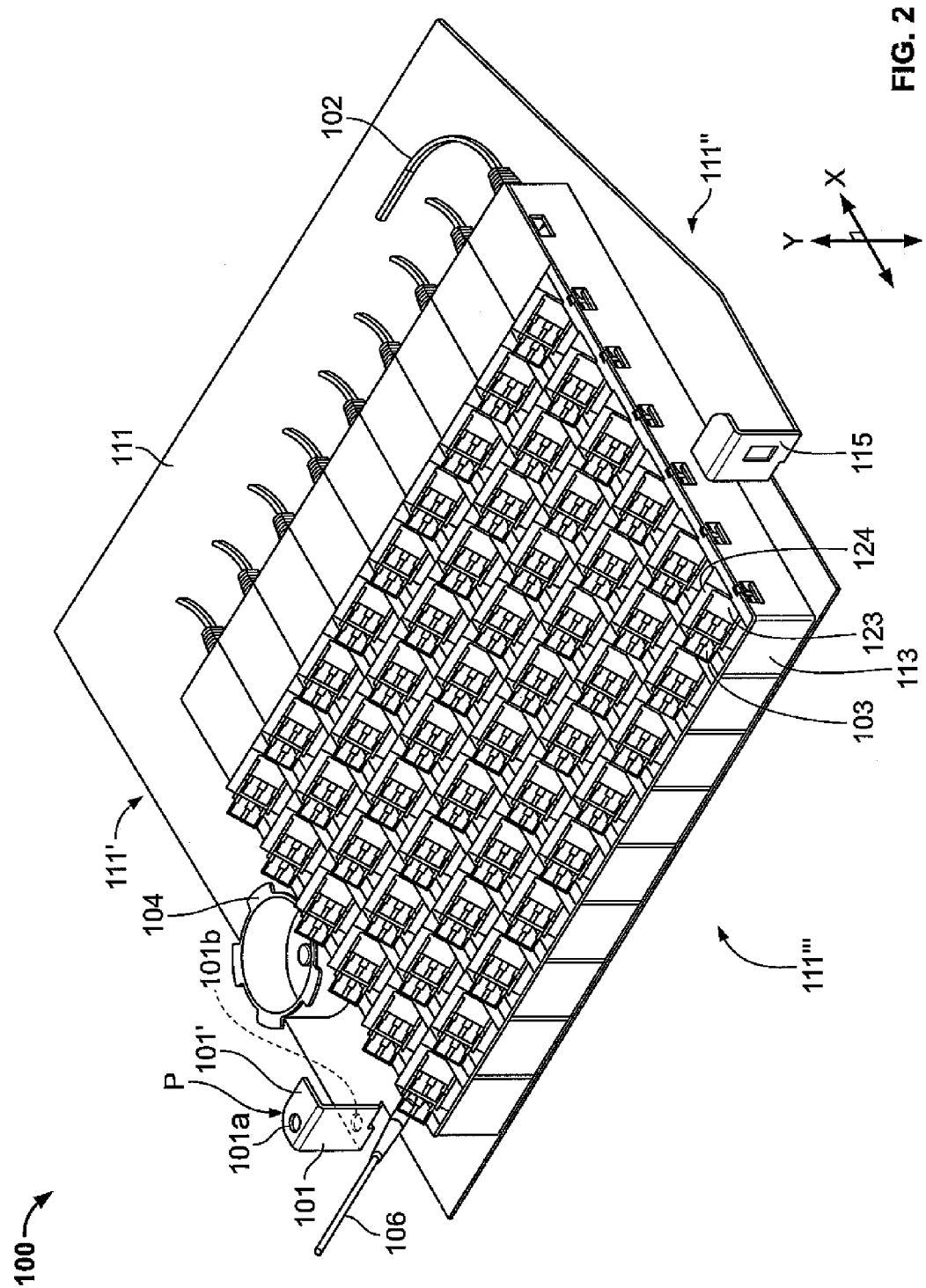
FIG. 2 is a perspective view of an exemplary tray for a horizontally-aligned fiber optic patching assembly, wherein the tray is configured to be movably positioned within a cabinet enclosure via a pivotal relationship.
Figure 3:
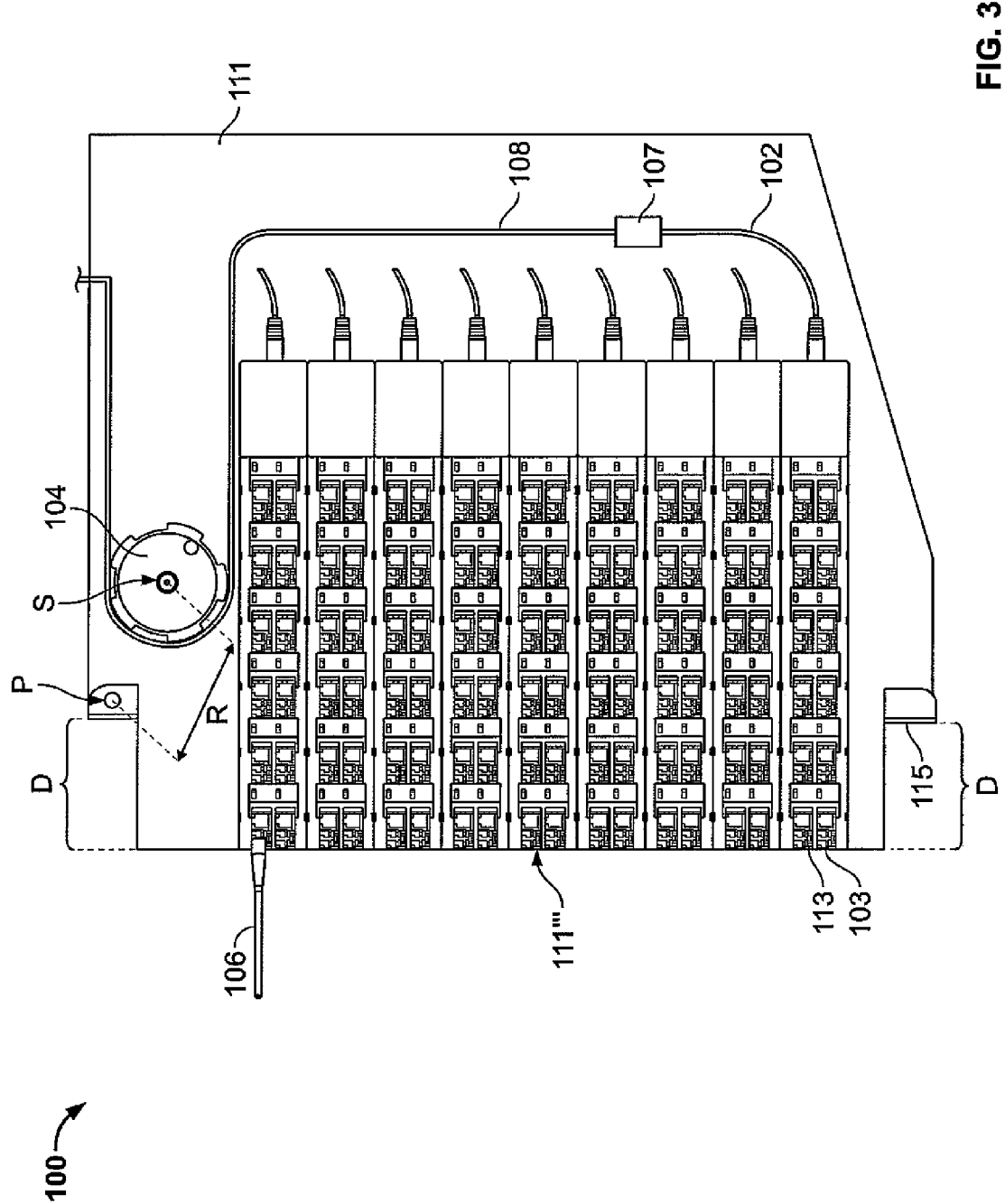
FIG. 3 is a top view of the exemplary tray of FIG. 2.
Figure 4:
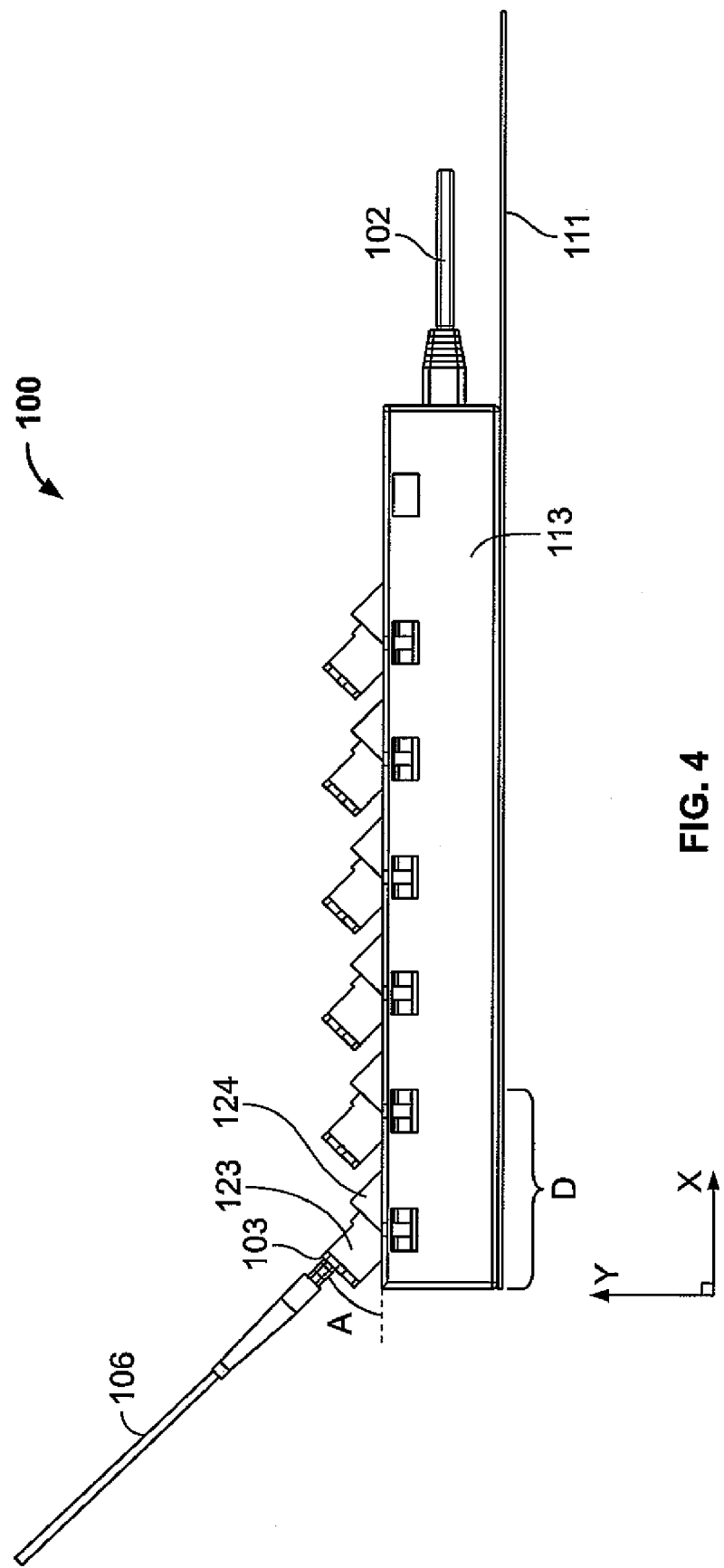
FIG. 4 is a side view of the exemplary tray of FIG. 2.

With initial reference to FIGS. 2-4, an exemplary tray 100 for a horizontally-aligned patching assembly is depicted. The tray 100 generally includes a tray surface 111 and a plurality of fiber optic ports (also referred to as adapters) 103 mounted with respect to tray surface 111. Typically, the plurality of ports 103 are aligned in substantially horizontal rows (e.g., along the axis "x") extending rearwardly from a front side 111'''. In exemplary embodiments, one or more blanks (not depicted) may substitute for one or more ports 103, depending on desired system specifications. Each port 103 is adapted to receive a fiber optic connector (e.g., patch cord).

In exemplary embodiments, tray 100 includes a plurality of fiber optic quad structures 124. Each quad structure 124 includes a pair of side by side duplex ports 123. Each duplex port 123 includes a pair of fiber optic ports, i.e., a transmission port and a receiving port. Each duplex port 123 is adapted to receive a pair of fiber optic cables, e.g., fiber optic patch cord 106. These cables are, generally, flexible in order to allow for patching between ports and/or with external systems. In exemplary embodiments, patch cords, e.g., patch cord 106, are contained within a ½ to 1 Rack Mounting Unit (1 rmu=1.75") space above the patching plane.

In exemplary embodiments, a plurality of ports 103 is typically organized using one or more cassette shells 113. Cassette shells 113 facilitate mounting the ports 103 relative to the tray surface 111 and (optionally) allow for plug-and-go capability. Each cassette shell 113 may advantageously include a row of six quad structures 124 (i.e., a "six pack" cassette). Thus, the tray 100 may include an alignment of nine (9) six-pack cassettes (as depicted). It is important to note, however, that the organizational configurations/arrangements of the ports 103 presented herein, e.g., relating to quad structures, duplex ports, cassettes, etc., are not limiting. Indeed, the particular organization/arrangement of the ports 103 may advantageously be adapted depending on the particular needs and constraints of a desired patching system.

One beneficial advantage of using cassette shells 113 relates to fiber optic cord management. Thus, each cassette shell 113 includes a back bone cable 102. In exemplary embodiments, tray 100 provides for plug-and-go solutions, wherein the backbone cable 102 is pre-terminated (plug-and-go ready). For example, back bone cable 102 may be adapted to plug into a standard adapter 107, which may take the form, e.g., of an MPO adapter. The adapter 107 may advantageously be mounted relative to the back end of the tray surface 111, allowing for easy installation and removal of the cassette shells 113. The adapter 107 typically connects and/or facilitates communications with external and/or surrounding systems/equipment by means of a fiber optic cord 108.

In exemplary embodiments, the tray surface 111 may include a hinge flange 101 perpendicular to the tray surface 111 on a first lateral side 111'. The hinge flange 101 typically includes a bent over lip portion 101' forming a small parallel surface above the tray surface 111. A first pivot hole 101a and second pivot hole 101b are defined through the lip portion 101' and the tray surface 111, respectively, such that the first and second pivot holes 101a and 101b are substantially aligned along the "y" axis and configured to allow for the insertion of a pivot feature (not depicted), such as a bolt or threaded screw. Thus, the pivot feature allows the tray 100 to rotate around pivot point "P" defined by the first and second pivot holes 101a and 101b. Rotating the tray 100 effectively positions the tray 100 in or out of a cabinet enclosure (see FIG. 5). The disclosed mechanism provides quick and easy access to all of the ports 103 associated with the tray 100.

In general, the back bone cables 102 need to extend following the arc path defined by the radial distance from pivot point "P" to the connection point of a backbone cable 102 to a cassette shell 113. Thus, in exemplary embodiments, backbone cable 102 is long enough (e.g., has sufficient slack) to permit requisite levels/degrees of rotation. In further embodiments, the tray 100 may advantageously include a cable management spool 104 mounted with respect to the tray surface 111 and defining a spool center "S". As depicted in FIG. 3, cables 102 and/or 108 (depending on the embodiment) may be wrapped around the spool 104 before exiting the patching assembly. In general, the closer the spool center "S" is with respect to the pivot point "P" (e.g., the shorter the radial distance "R"), the less slack is needed to allow for uninhibited rotation. Thus, the inclusion of spool 104 may substantially reduce the need for long back bone patch cables. In exemplary embodiments, the radial distance "R" is between about 1 and 5 inches. This particular arrangement reduces the necessary slack from 15-18 inches to approximately 1-5 inches.

In exemplary embodiments of the present disclosure, the tray surface 111 includes an upwardly extending locking feature 115 positioned opposite the hinge flange 101 along the opposite lateral side 111". Locking feature 115 allows for securing the tray 100 within a cabinet enclosure to prevent unauthorized access. In order to freely clear the locking feature 115 during rotation of the tray 100, both the locking feature 115 and hinges flange 101 are generally positioned at a distance "D" measured rearwardly from front side 111'".

In exemplary embodiments, each port 103 extends at an acute angle "A" with respect to the horizontal plane associated with the tray surface 111. Angling the ports 103 advantageously allows for the insertion of fiber optic patch cables 106 while minimizing cable bend. Of note, over-bending of the cables may occur if the ports are angled vertically while insertion of cables would be made difficult by horizontal angling. Angling the ports 103 also minimizes the "overhead" cabinet enclosure space that would be necessary for patching operations.

Figure 5:
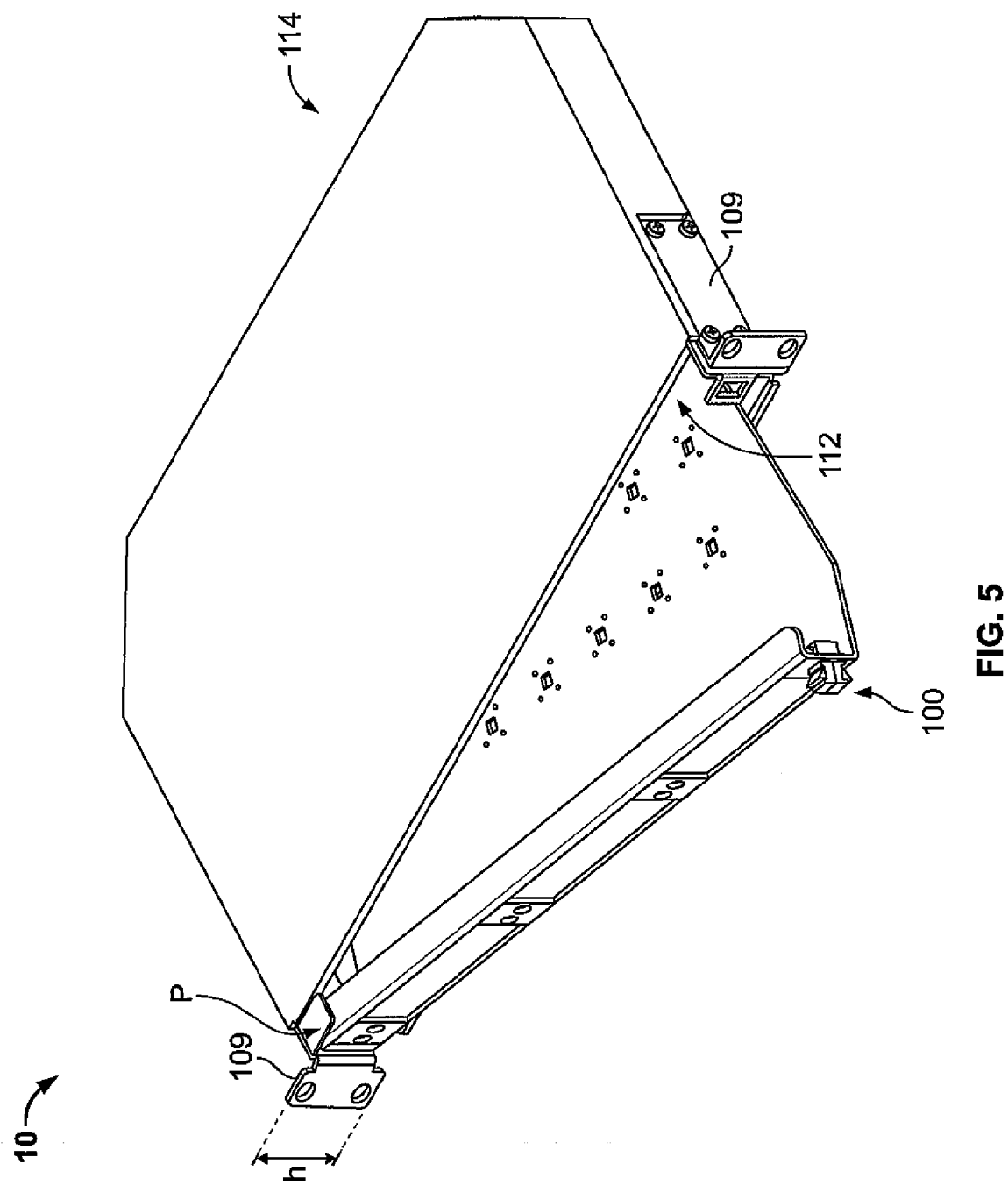
FIG. 5 is a perspective view of a horizontally-aligned fiber optic patching assembly wherein the exemplary tray of FIG. 2 is movably positioned within a cabinet enclosure via a pivotal relationship.

With reference now to FIG. 5, a horizontally-aligned fiber optic patching assembly 10 is depicted. The patching assembly 10 includes a cabinet enclosure 114 and a tray 100, e.g., the exemplary tray 100 of FIGS. 2-4. In general, the cabinet enclosure 114 defines a receiving cavity 112 within which the tray 100 may be movably positioned. In the exemplary embodiment depicted in FIG. 5, the tray 100 is pivotally attached relative to the cabinet enclosure 114 at a pivot point "P," e.g., by means of a pivot feature, as previously discussed. Typically, the cabinet enclosure 114 is configured and dimensioned for housing within a cable management rack, e.g., the Mighty Mo® 6 rack available from Ortronics, Inc. (New London, Conn.). Thus, in exemplary embodiments, the height "h" of the cabinet enclosure 114 is optimally minimized, e.g., in order to conserve rack space.

As previously discussed, the minimum height of the cabinet enclosure 114 is effectively determined by the "overhead" cabinet enclosure space needed for patching operations. In exemplary embodiments, height "h" can be any distance greater than or equal to about 0.5 inches. In further exemplary embodiments, height "h" is between about 0.5 inches and about 4 inches. Patching assembly 10 may also include a pair of mounting brackets 109 for facilitating mounting of the patching assembly 10 relative to a desired location, e.g., with respect to a cable management rack. To this end, the mounting brackets 109 may define, e.g., mounting bracket holes adapted to receive mounting features (not pictured), such as screws, bolts, nails, etc.

Figure 6:
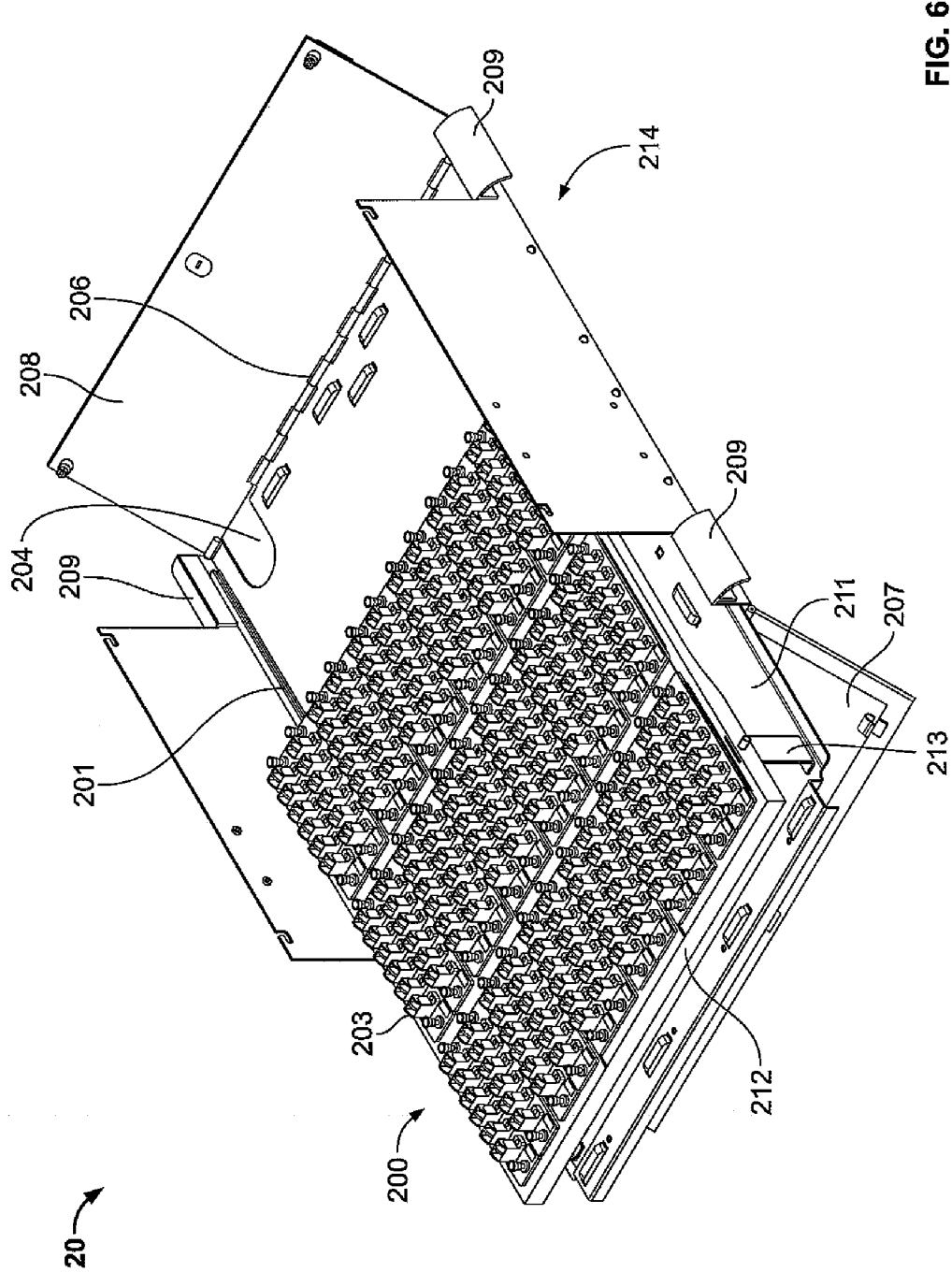
FIG. 6 is a perspective view of an exemplary horizontally-aligned fiber optic patching assembly, wherein a tray including fiber optic ports is movably positioned within a cabinet enclosure via a translational relationship.
Figure 7:
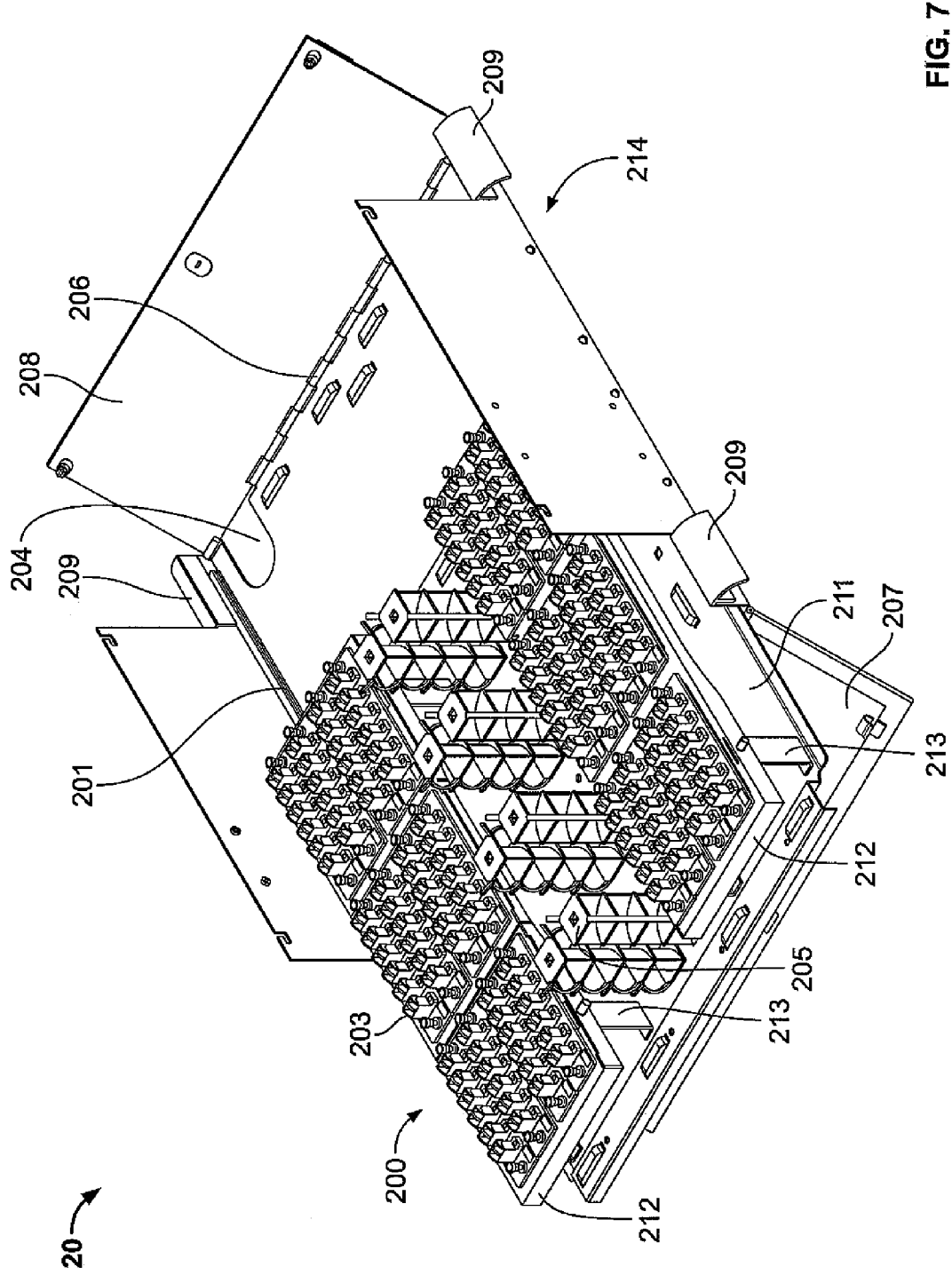
FIG. 7 and FIG. 8 are perspective views of exemplary alternate configurations for the horizontally-aligned fiber optic patching assembly of FIG. 6, further including fiber management clips.
Figure 8:
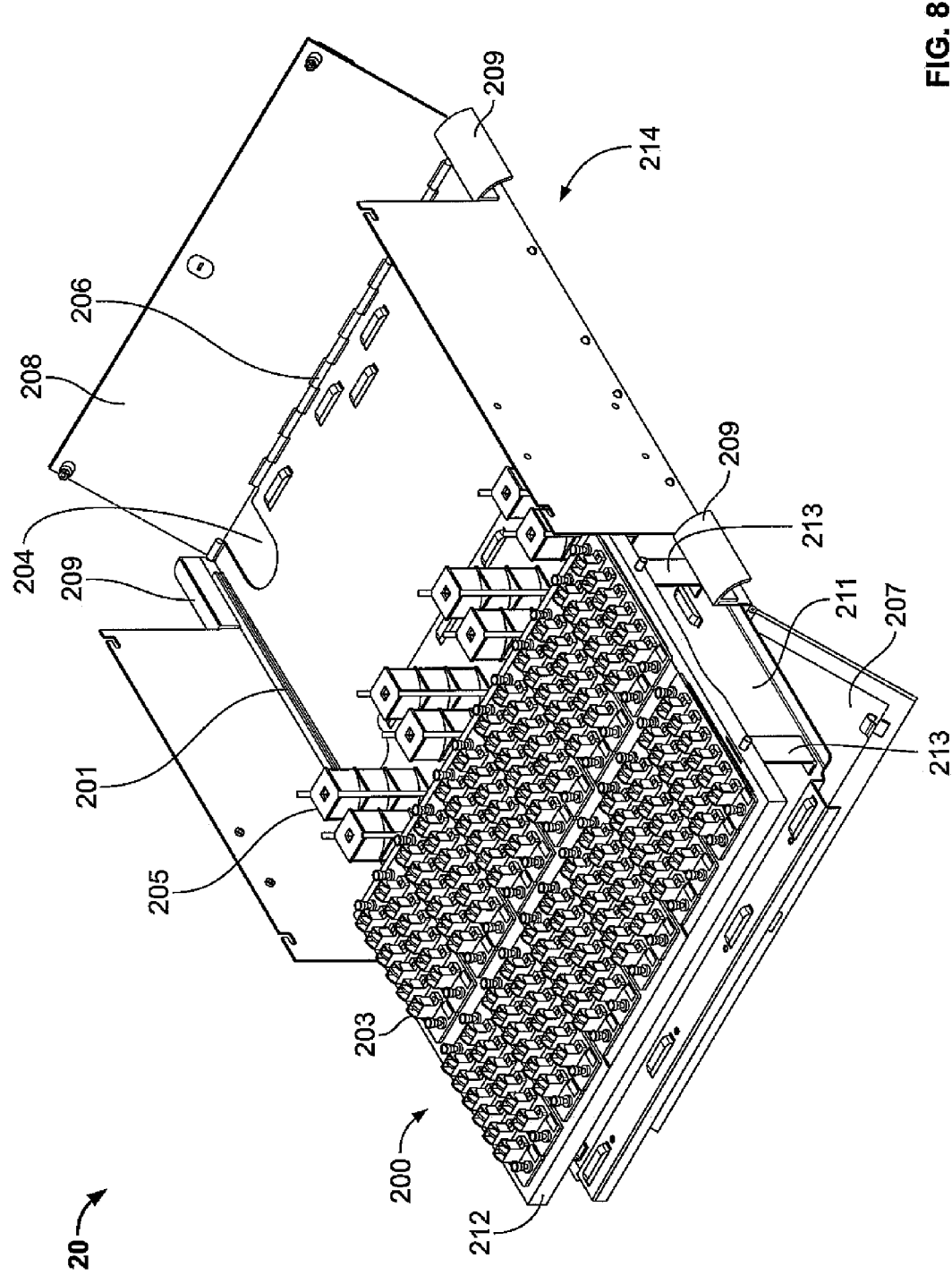

With reference now to FIGS. 6-8, three embodiments of an exemplary horizontally-aligned fiber optic patching assembly 20 are depicted. Generally, patching assembly 20 includes a tray 200 and a cabinet enclosure 214. The tray 200 is movably positioned within the cabinet enclosure 214. In the exemplary embodiments depicted in FIGS. 6-8, the tray 200 is translationally positioned relative to the cabinet enclosure 214 by means of a sliding track 201. Thus, the sliding track 201 facilitates access to the tray 200 in that tray 200 is adapted to slide in/out of the cabinet enclosure 214. The cabinet enclosure 214, as depicted, includes front and rear access doors 207 and 208, respectively, which are hingedly attached relative to the base of the cabinet enclosure 214 by means of hinges 206. Thus, the tray 200 is advantageously accessible from both the front and back ends of the cabinet enclosure 214. In exemplary embodiments, cabinet enclosure 214 may or may not include a top. Typically, the cabinet enclosure 114 is configured and dimensioned for housing within a cable management rack, e.g., the Mighty Mo® 6 rack available from Ortronics, Inc. (New London, Conn.). In exemplary embodiments, cabinet bend limiting clips 209 may be included to further facilitate rack installation and to minimize cabinet bend.

Tray 200 generally includes a tray surface 211 and a plurality of fiber optic ports (also referred to as adapters) 203 mounted relative to the tray surface 211. Generally, the ports 203 are aligned and configured along a horizontal plane, thereby advantageously increasing the patching density of the assembly relative to prior art designs. In the exemplary embodiments depicted in FIGS. 6-8, the ports 203 are mounted with respect to a mounting deck 212. The mounting deck 212 is generally secured relative to the tray surface 211 by means of brackets 213. Brackets 213 also serve to elevate the mounting deck 212 above the tray surface 211, thus allowing space for cord management therebetween. To further facilitate cord management, cord management clips 205 may be included (see, e.g., FIGS. 7-8). In general, the cords extend from under the mounting deck 212 and out of the cabinet enclosure 214 by means of an opening 204 defined through the cabinet enclosure 214. The cords (not depicted) are generally selected so as to include/provide enough slack to allow the tray 200 to slide in or out of the cabinet enclosure 214 in an unobstructed/uninhibited manner. It is important to note once again that the organizational configurations/arrangements, e.g., of the ports 203, mounting deck 212, cord management clips 205 and associated structures/components as described herein, e.g., with reference to FIGS. 6-8, are not limiting. Indeed, these particular organizations/arrangements may advantageously be adapted depending on the particular needs and constraints of a desired patching system.

With reference now to FIGS. 9-15, further exemplary embodiments of a horizontally-aligned fiber optic patching assembly 30 are depicted. Generally, the patching assembly 30 includes a tray 300, and a cabinet enclosure 314. In the exemplary embodiments depicted in FIGS. 9-15, the tray 300 includes a plurality of fiber optic ports 303 mounted relative to both the top and bottom faces of the tray 300. Thus, patching density is advantageously increased. Access to the top and bottom faces is advantageously facilitated by tilting the tray 300 as later discussed herein.

In the exemplary embodiments depicted, the tray 300 is movably positioned within the cabinet enclosure 314 via a translational relationship. As previously discussed, the tray 300 may be translationally mounted relative to the cabinet enclosure 314 by means of one or more sliding tracks e.g., sliding tracks 331 and 332. In the exemplary embodiments depicted in FIGS. 9-15, the cabinet enclosure 314 includes a top sliding track 331 and a bottom sliding track 332. The tray 300 includes front pins 344 and middle pins 345 which are configured to slide along the bottom sliding track 332 and rear pins 343 which are configured to slide along the top sliding track 331. The tray 300 may also include rear flanges 341 for elevating the rear pins 343 into proper alignment with the top sliding track 331, thus leveling the tray 300 when positioned within the cabinet enclosure (see FIGS. 11-12). The patching assembly 30 is configured such that tray 300 is accessible via either the front side (see FIGS. 9-10) or the back side (see FIGS. 13-15) of the cabinet enclosure 314. Furthermore, the top and bottom sliding tracks 331 and 332 are advantageously configured such that the tray 300 may be tilted up or down, thus facilitating access to either face of the tray 300.

Figure 9:
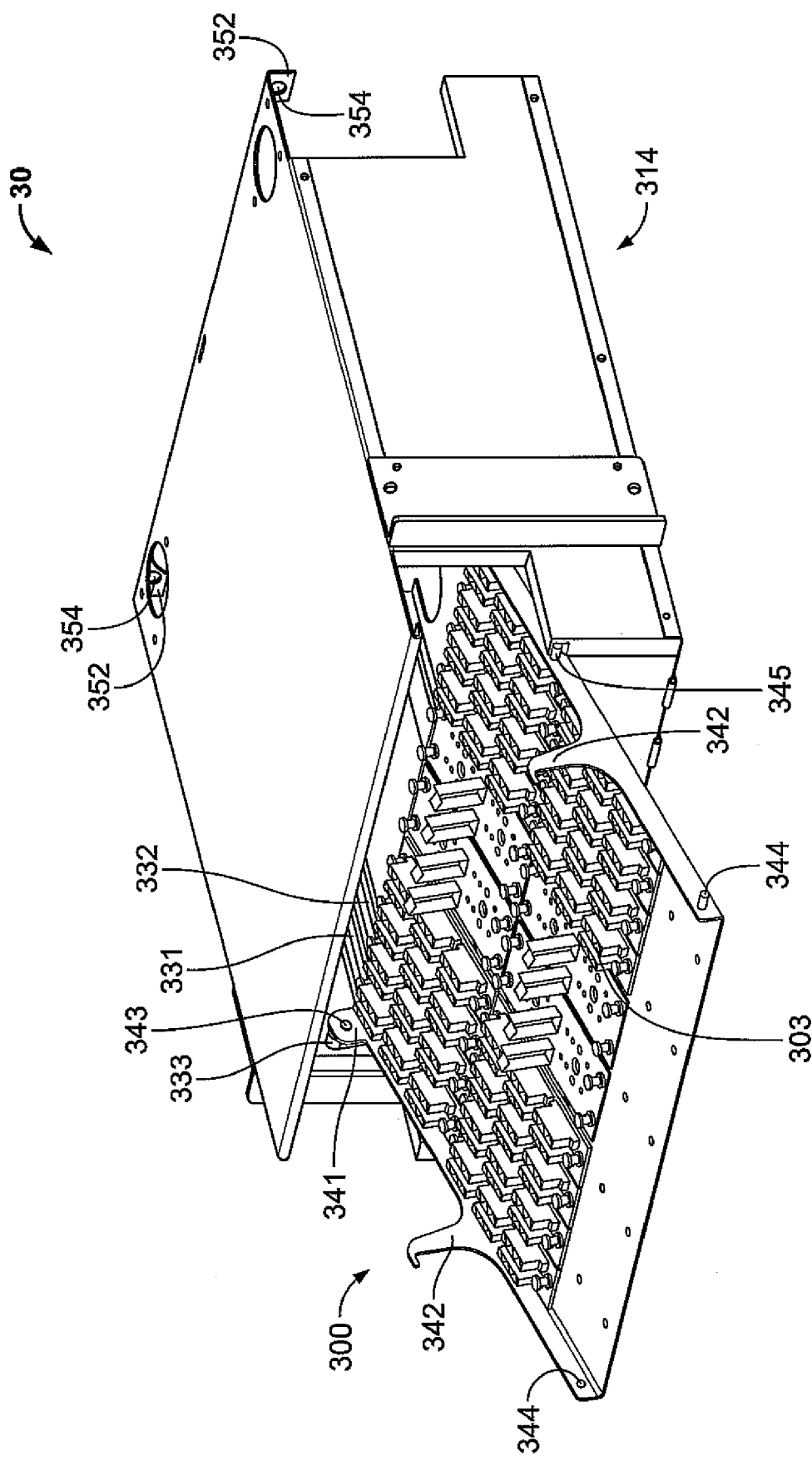
FIGS. 9-15 depict an exemplary horizontally-aligned fiber optic patching assembly, wherein a tray includes fiber optic ports mounted relative to both the top and bottom faces of the tray and is movably positioned with respect to a cabinet enclosure via a translational relationship.
Figure 10:
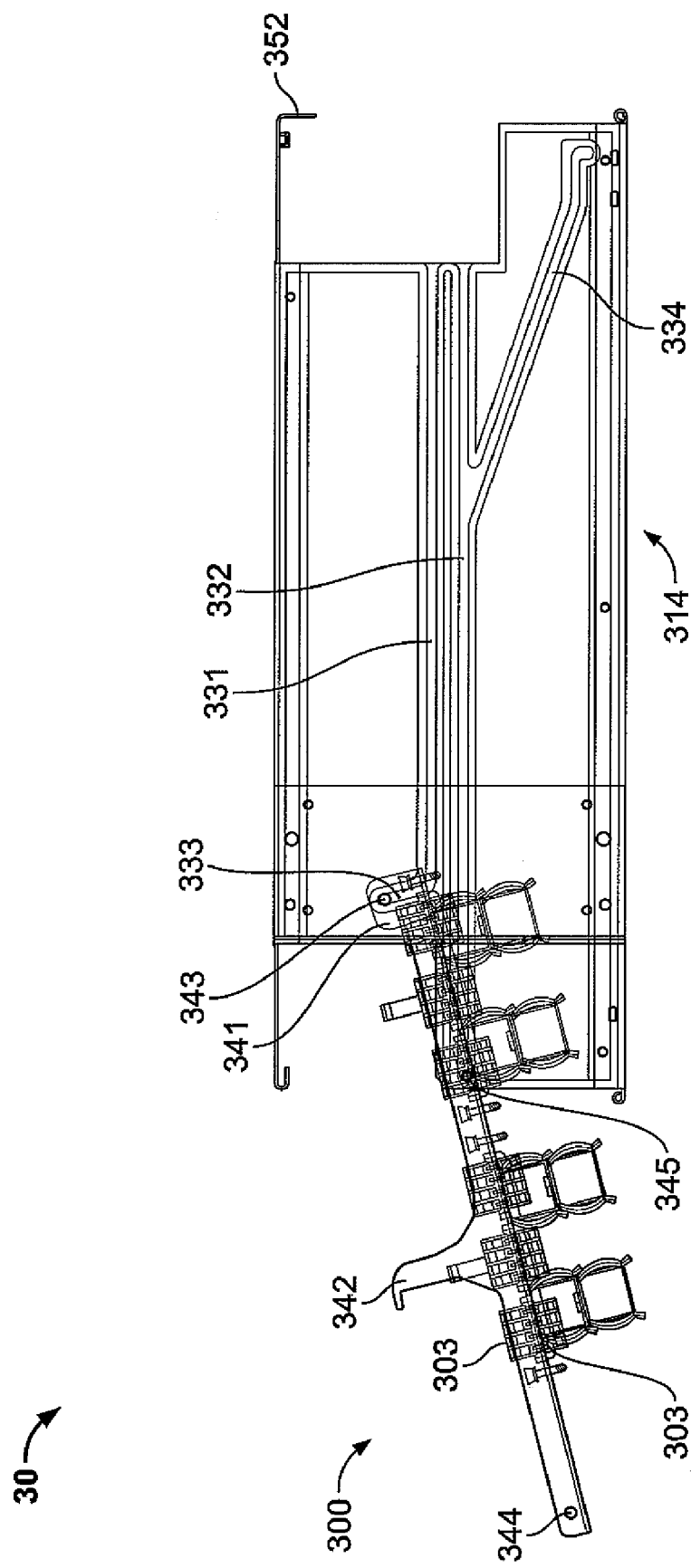
Figure 11:
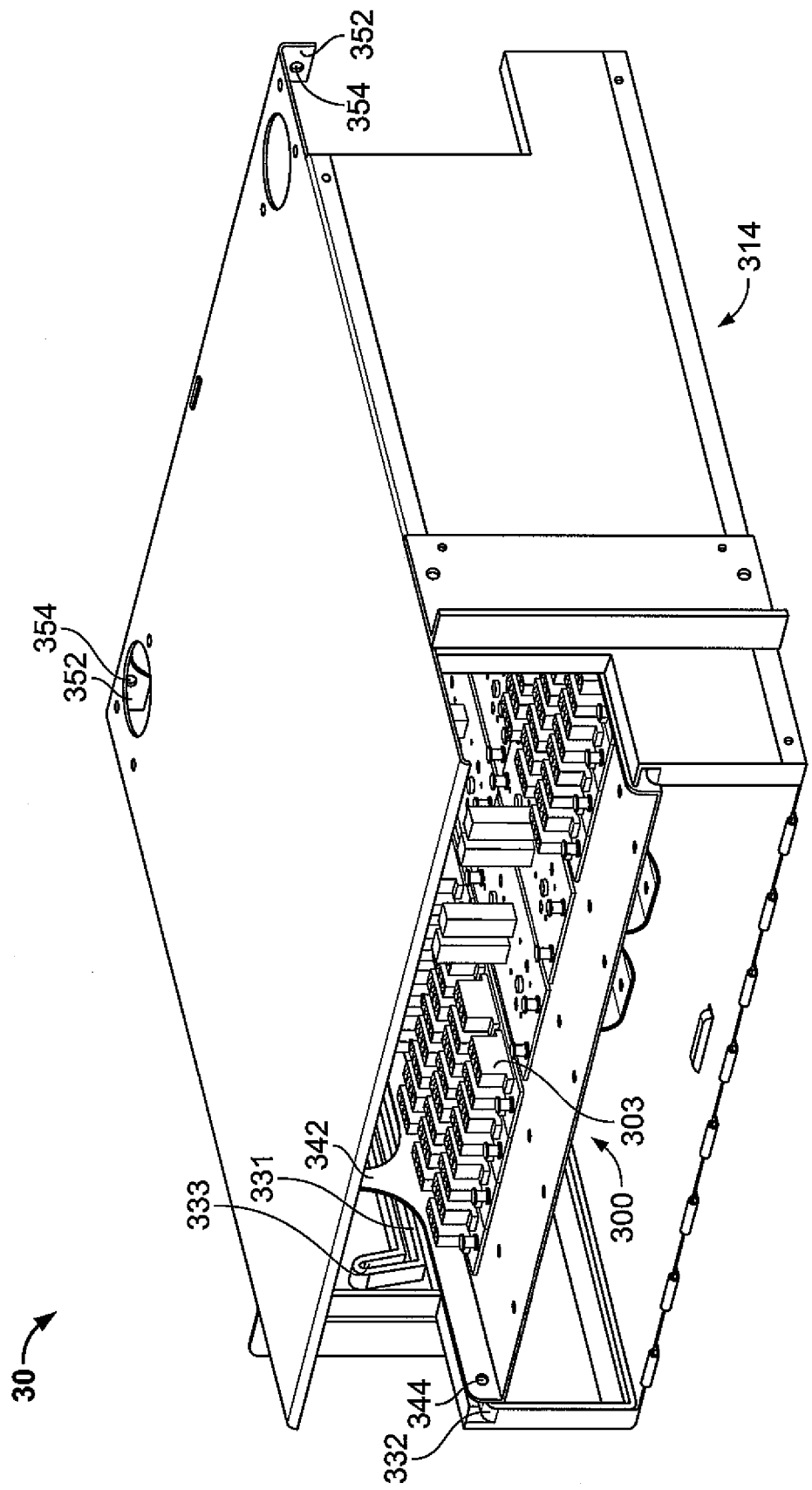
Figure 12:
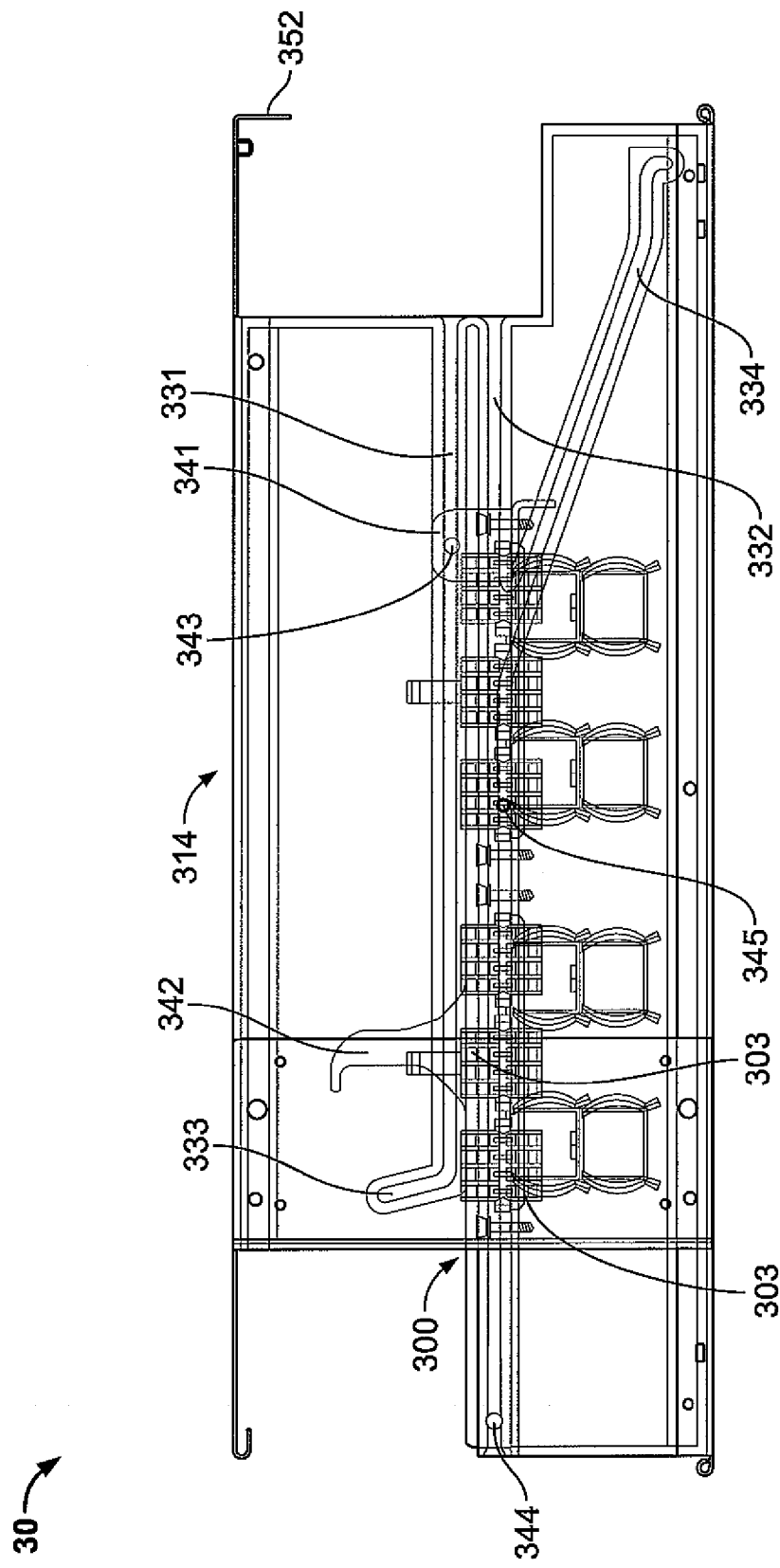

With particular reference to FIGS. 9-10, frontal access of the tray 300 is depicted. The tray 300 is tilted down, thus facilitating access to the top face of the tray 300. The tilting of the tray 300 is effected by a rising portion 333 of the top sliding track 331. The rising portion 333 of the top sliding track 331 elevates the back of the tray 300, thus tilting the tray relative to a pivot axis defined by the middle pins 345. Since the pivot axis is set back slightly from the center of mass of the tray 200, the tray tilts downwards as it is removed from within the cabinet enclosure 314 and levels as it is replaced within the cabinet enclosure 314.

Figure 13:
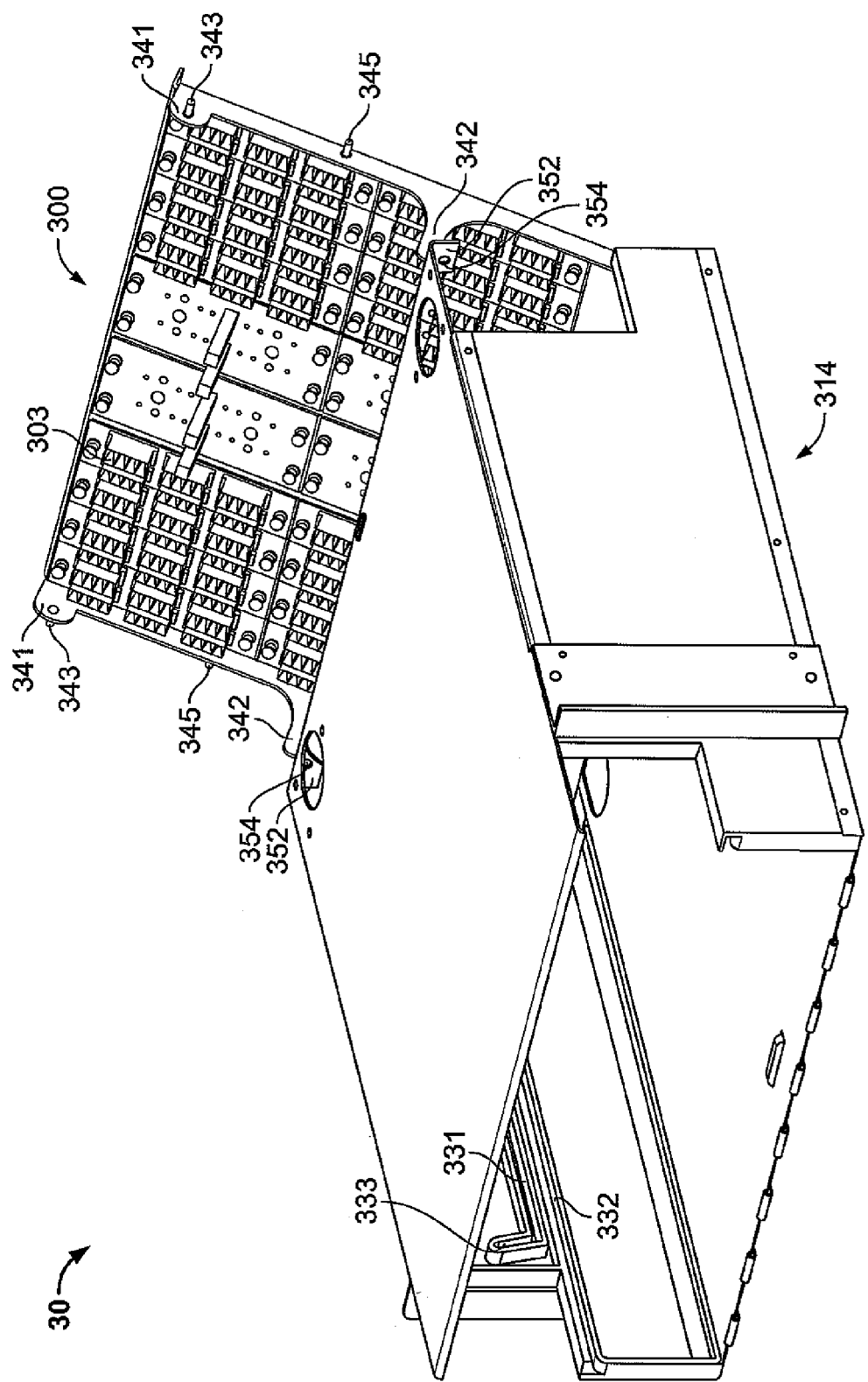
Figure 14:
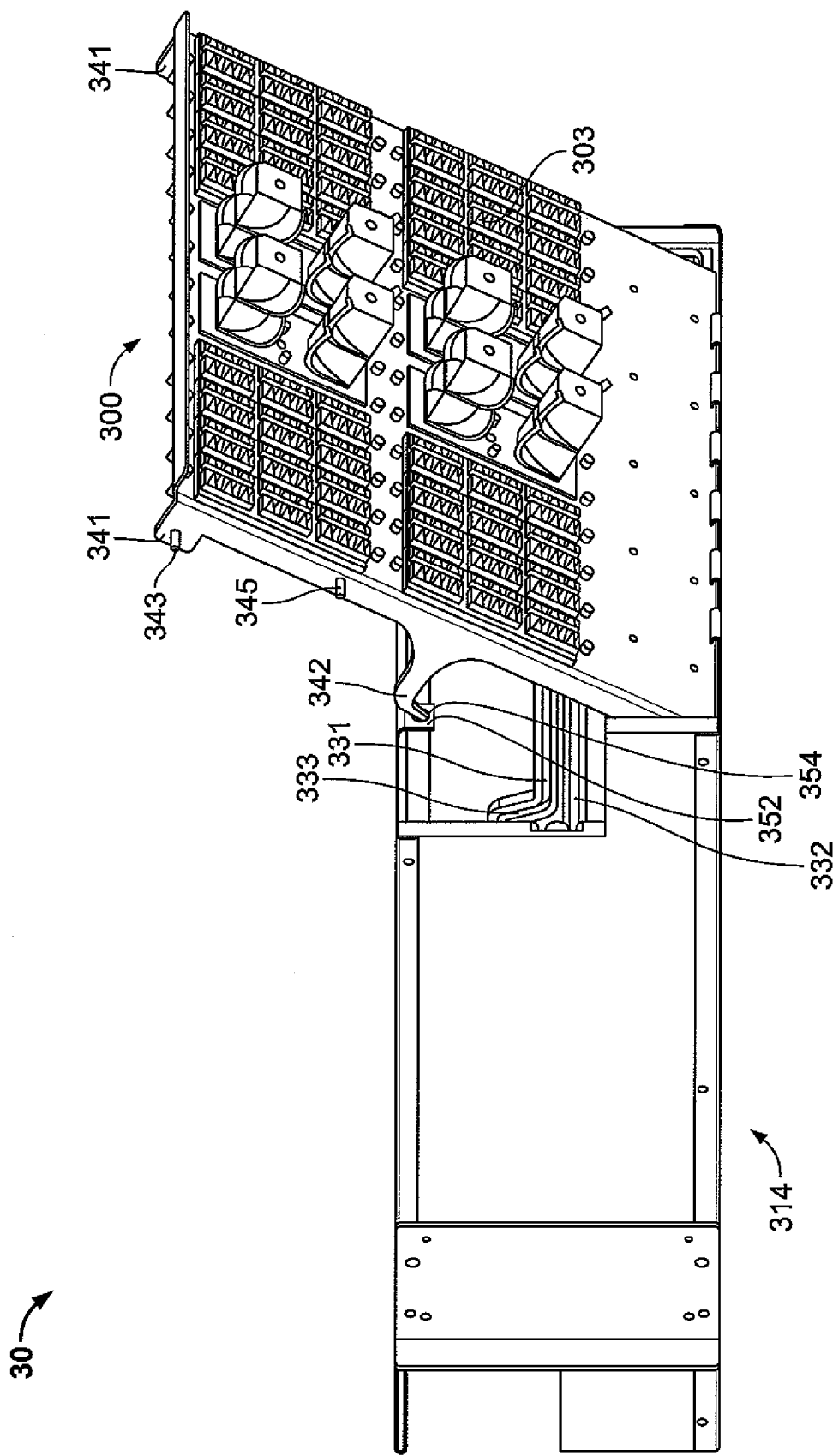
Figure 15:
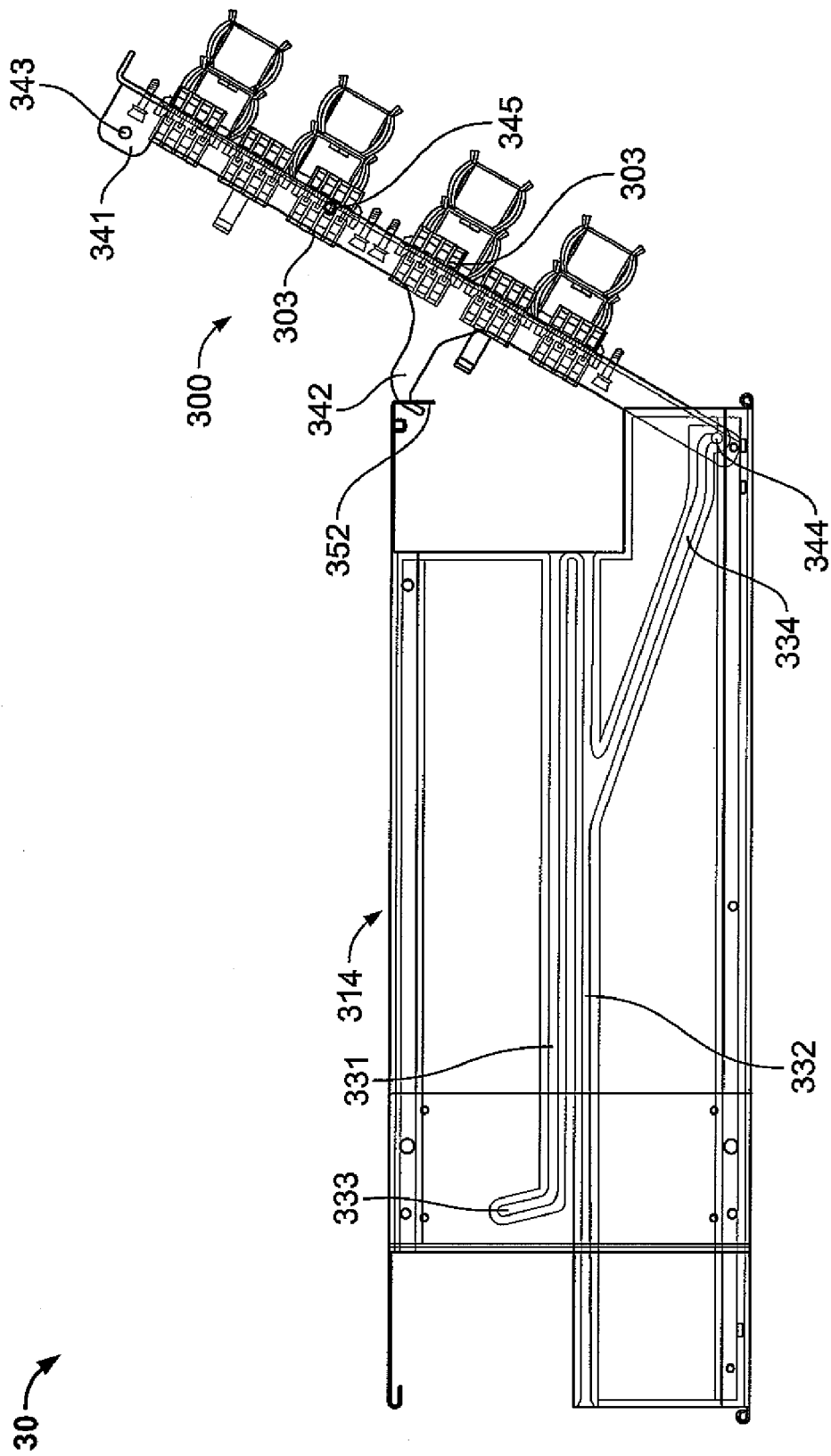

With particular reference to FIGS. 13-15, rear access to the tray 300 is depicted. The tray 300 is tilted up, thus facilitating access to the bottom face of the tray 300. The tilting of the tray 300 is effected by a descending portion 334 of the bottom sliding track 332. The descending portion 334 of the bottom sliding track 332 allows the back of the tray 300 to drop. The tray 300 may then be manually tilted upwards relative to a pivot axis defined by the front pins 344. The tray 300 may be secured in an upward tilted position by means of fasteners 342. In exemplary embodiments, the fasteners 342 include a hooked tip which latches relative to openings 354 defined in latching flanges 352 along the rear of the cabinet enclosure 314.

Although the present disclosure has been described with reference to exemplary embodiments and implementations thereof, the disclosed assemblies and methods are not limited to such exemplary embodiments/implementations. Rather, as will be readily apparent to persons skilled in the art from the description provided herein, the disclosed assemblies and methods are susceptible to modifications, alterations and enhancements without departing from the spirit or scope of the present disclosure. Accordingly, the present disclosure expressly encompasses such modification, alterations and enhancements within the scope hereof.

What is claimed is:

1. A fiber optic patching assembly, comprising:
   (a) a cabinet enclosure defining a receiving cavity;
   (b) a patch tray defining a front side and movably positioned within the receiving cavity of the cabinet enclosure;
   (c) a plurality of fiber optic ports mounted in a horizontal plane relative to the tray, each fiber optic port defining at least one port opening;
   wherein the plurality of fiber optic ports are aligned in a plurality of horizontal rows in the horizontal plane, each horizontal row defines a vertical plane that is transversely aligned relative to the front side of the tray; and;
   wherein each port opening in a particular horizontal row is (i) oriented at an acute angle or perpendicular relative to the horizontal plane; and (ii) aligned with the vertical plane defined by the horizontal row.

2. The assembly according to claim 1, wherein the plurality of fiber optic ports include one or more duplex ports.

3. The assembly according to claim 1, wherein the plurality of fiber optic ports include one or more quad structures.

4. The assembly according to claim 1, wherein the plurality of fiber optic ports are supported by at least one cassette shell mounted with respect to the patch tray.

5. The assembly according to claim 4, wherein the at least one cassette shell includes a pre-terminated backbone cable.

6. The assembly according to claim 5, wherein the backbone cable is detachably engaged with an adapter associated with the at least one cassette shell.

7. The assembly according to claim 1, wherein the plurality of fiber optic ports are arranged in one or more side-by-side pairs, and wherein each of the one or more side-by-side pairs includes a transmission port and a receiving port.

8. The assembly according to claim 7, wherein the each of the one or more side-by-side pairs is adapted to receive a duplex patch cord.

9. The assembly according to claim 1, wherein each of the plurality of fiber optic ports is angled toward the front of the patch tray.

10. The assembly according to claim 1, wherein the patch tray is either pivotally or translationally mounted with respect to the cabinet enclosure.

11. The assembly according to claim 10, wherein the patch tray includes one or more hinge flanges for pivotally mounting the patch tray with respect to the cabinet enclosure.

12. The assembly according to claim 10, wherein the cabinet enclosure includes one or more sliding tracks for facilitating translational motion of the patch tray relative to the cabinet enclosure.

13. The assembly according to claim 12, wherein the cabinet enclosure includes a top sliding track and a bottom sliding track, and wherein the top sliding track and the bottom sliding track facilitate tilting the patch tray upon withdrawal from within the cabinet enclosure.

14. The assembly according to claim 1, wherein the fiber optic ports are mounted relative to one of: (i) a top face of the patch tray, (ii) a bottom face of the patch tray, and (iii) both the top and the bottom faces of the patch tray.

15. The assembly according to claim 1, wherein the patch tray may be tilted up or down upon withdrawal from within the cabinet enclosure.

16. The assembly according to claim 1, wherein the patch tray is accessible from one or more sides of the cabinet enclosure.

17. The assembly according to claim 1, wherein the patch tray further includes at least one component adapted to facilitate cord management selected from the group consisting of: (i) a spool, (ii) cord management clips, and (iii) a combination thereof.

18. The assembly according to claim 1, further comprising a spool to facilitate cord management, wherein the patch tray is pivotally mounted with respect to the cabinet enclosure at a pivot point, and wherein the spool is positioned in close proximity of the pivot point.

19. The assembly according to claim 1, further comprising a locking mechanism associated with the cabinet enclosure for securing access to the patch tray.

20. The assembly according to claim 1, wherein the cabinet enclosure includes a top cover.

21. The assembly according to claim 1, wherein the height of the cabinet enclosure is selected so as to permit patching operations therewithin.

22. The assembly according to claim 1, wherein the cabinet enclosure includes at least one component for facilitating mounting relative to a cable management rack selected from the group consisting of: (i) mounting brackets, (ii) cabinet bend limiting clips, and (iii) combinations thereof.

23. The assembly according to claim 1, wherein the plurality of fiber optic ports are mounted with respect to a mounting deck, and wherein the mounting deck is elevated over and secured to the patch tray by brackets.

24. A method for configuring fiber optic ports, comprising the steps of:
(a) mounting a plurality of fiber optic ports with respect to a tray in a horizontal plane, each fiber optic port defining at least one port opening and the plurality of fiber optic ports being aligned in a plurality of horizontal rows in the horizontal plane; and
(b) movably mounting the tray with respect to a cabinet enclosure, with the tray defining a front side; and
wherein each horizontal row defines a vertical plane that is transversely aligned relative to the front side of the tray; and
wherein each port opening in a particular horizontal row is (i) oriented at an acute angle or perpendicular relative to the horizontal plane; and (ii) aligned with the vertical plane defined by the horizontal row.

25. The method according to claim 24, wherein the tray is either pivotally or translationally mounted with respect to the cabinet enclosure.

* * * * *